United States Patent
Campetti et al.

(10) Patent No.: US 11,748,485 B2
(45) Date of Patent: Sep. 5, 2023

(54) SYSTEM AND METHOD FOR BOOTING USING HSM INTEGRATED CHAIN OF TRUST CERTIFICATES

(71) Applicant: Dell Products L.P., Round Rock, TX (US)

(72) Inventors: Christopher Campetti, Holden, MA (US); Huijun Xie, Hopkinton, MA (US); Antonio L. Fontes, Northbridge, MA (US); Azzam Tannous, Framingham, MA (US); Anoop Gulati, Pflugerville, TX (US)

(73) Assignee: Dell Products L.P., Round Rock, TX (US)

( * ) Notice: Subject to any disclaimer, the term of this patent is extended or adjusted under 35 U.S.C. 154(b) by 230 days.

(21) Appl. No.: 17/443,979

(22) Filed: Jul. 29, 2021

(65) Prior Publication Data

US 2023/0035801 A1 Feb. 2, 2023

(51) Int. Cl.
*G06F 21/57* (2013.01)
*H04L 9/32* (2006.01)
*H04L 9/08* (2006.01)
*H04L 9/00* (2022.01)

(52) U.S. Cl.
CPC .......... *G06F 21/575* (2013.01); *G06F 21/572* (2013.01); *H04L 9/0897* (2013.01); *H04L 9/3268* (2013.01); *G06F 2221/033* (2013.01); *H04L 9/50* (2022.05)

(58) Field of Classification Search
CPC ................. G06F 21/575; G06F 21/572; G06F 2221/033; H04L 9/0897; H04L 9/3268
See application file for complete search history.

(56) References Cited

U.S. PATENT DOCUMENTS

| 10,263,789 B1* | 4/2019 | Popoveniuc .......... H04L 9/3268 |
| 2021/0103661 A1* | 4/2021 | Wu ........................ G06F 21/572 |
| 2021/0397716 A1* | 12/2021 | Kovah .................. G06F 9/4406 |

OTHER PUBLICATIONS

ARM, "Juno ARM Development Platform Getting Started Guide," 2015. [Online]. Available: http://infocenter.arm.com/help/index.jsp?topic=/com.arm.doc.dui0928e/CJHIDGJF.html.
ARM, "ARM Trusted Firmware," github, 2015. [Online]. Available: https://github.com/ARM-software/arm-trusted-firmware/tree/master/tools/cert_create.

* cited by examiner

*Primary Examiner* — Nelson S. Giddins
(74) *Attorney, Agent, or Firm* — McDermott Will & Emery LLP

(57) ABSTRACT

A system for secure booting of an information handling system stores a Root of Trust private key in a hardware security module (HSM). A HSM-Integrated certificate creation utility receives inputs such as bin files for each firmware volume associated with a boot sequence. The HSM-Integrated certificate creation utility loads the correct extensions for the firmware volume, generates a certificate signing request (CSR) and generates a certificate based on the CSR. The certificates can be provided to a boot sequence for processing in a trusted firmware implementation without a certificate creation utility consuming the Hardware Root of Trust private key as a file that could be compromised.

15 Claims, 6 Drawing Sheets

SYSTEM AND METHOD FOR BOOTING USING HSM INTEGRATED CHAIN OF TRUST CERTIFICATES

BACKGROUND

Field of the Disclosure

This disclosure relates generally to security for information handling systems and, more particularly, to systems for securing a chain of trust (CoT) for multi-stage bootloaders.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Security of a platform during booting is a concern. As part of a secure boot process, the platform validates the integrity and authenticity of each firmware before the firmware runs. One approach to this issue is the ARM Trusted Firmware (ATF) implementation, and specifically the Trusted Board Boot Requirements (TBBR) interface. Part of the Trusted Board Boot is to maintain a chain of trust (CoT) among multi-stage bootloaders.

SUMMARY

Embodiments disclosed herein may be generally directed to systems and methods for securing information handling systems by preventing malicious firmware from interfering with a multi-stage bootloader.

Embodiments integrate the hardware security module (HSM) in the generation of the CoT certificates, as opposed to existing approaches that require the private key to exist as a file on the File System. HSM utilization ensures cryptographic keys remain tamper-proof, which ensures the integrity and authenticity of firmware and software.

Embodiments disclosed herein may be directed to a system and method for enforcing a chain of trust (CoT) using standardized certificates. The custom extensions to the certificates store information for the CoT.

BRIEF DESCRIPTION OF THE DRAWINGS

For a more complete understanding of the invention and its features and advantages, reference is now made to the following description, taken in conjunction with the accompanying drawings, in which.

DESCRIPTION OF PARTICULAR EMBODIMENT(S)

Figure 1:
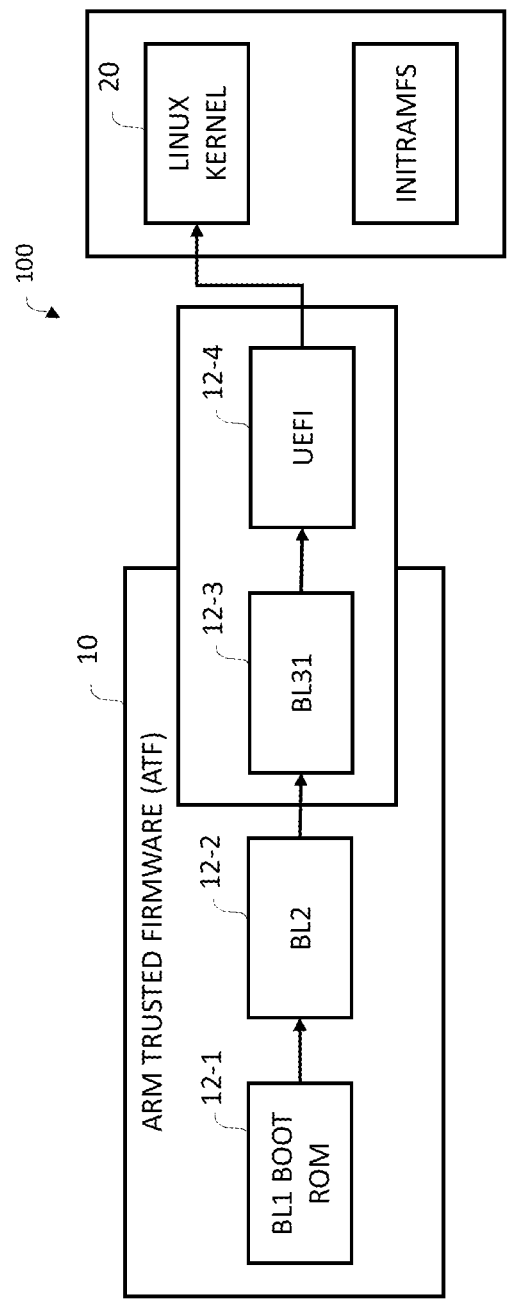
FIG. 1 is a block diagram of selected elements in a multi-stage boot sequence.

In the following description, details are set forth by way of example to facilitate discussion of the disclosed subject matter. It should be apparent to a person of ordinary skill in the field, however, that the disclosed embodiments are exemplary and not exhaustive of all possible embodiments.

As used herein, a hyphenated form of a reference numeral refers to a specific instance of an element and the un-hyphenated form of the reference numeral refers to the collective or generic element. Thus, for example, certificate "40-1" refers to an instance of an input certificate, which may be referred to collectively as certificates "40" and any one of which may be referred to generically as certificate "40."

For the purposes of this disclosure, an information handling system may include an instrumentality or aggregate of instrumentalities operable to compute, classify, process, transmit, receive, retrieve, originate, switch, store, display, manifest, detect, record, reproduce, handle, or utilize various forms of information, intelligence, or data for business, scientific, control, entertainment, or other purposes. For example, an information handling system may be a personal computer, a consumer electronic device, a network storage device, or another suitable device and may vary in size, shape, performance, functionality, and price. The information handling system may include memory, one or more processing resources such as a central processing unit (CPU) or hardware or software control logic. Additional components of the information handling system may include one or more storage devices, one or more communications ports for communicating with external devices as well as various input and output (I/O) devices, such as a keyboard, a mouse, and one or more video displays. The information handling system may also include one or more buses operable to transmit communication between the various hardware components.

Embodiments disclosed herein include an information handling system with a hardware security module for maintaining a chain of trust for a boot sequence.

Embodiments disclosed herein are described with respect to a boot sequence involving firmware blocks or bootloaders (e.g., BL1, BL2 and BL31) associated with multi-stage booting to a BIOS but may also be practiced with other multi-stage boot sequences. Particular embodiments are best understood by reference to FIGS. 1-6, wherein like numbers are used to indicate like and corresponding parts.

Turning to the drawings, FIG. 1 illustrates a block diagram depicting selected elements in a common ARM multi-stage trusted board boot sequence 100 comprising multiple firmware volumes 12.

As shown in FIG. 1, a common boot sequence 100 may begin at Bootloader (BL)1 BOOT ROM firmware volume 12-1 and progress to BL2 firmware volume 12-2 to BL31 firmware volume 12-3 to unified extensible framework interface (UEFI) firmware volume 12-4 to load to Linux Kernel 20. As depicted in FIG. 1, BL1 BOOT ROM firmware volume 12-1, BL2 firmware volume 12-2 and BL31 firmware volume 12-3 may form part of an ARM trusted firmware (ATF) 10.

Chain of Trust

Part of the Trusted Board Boot (TBB) is to maintain a Chain of Trust (CoT) among the multi-stage firmware volumes 12 as shown in FIG. 1. The CoT (Chain of Trust) is enforced using five x.509 v3 certificates. The custom extensions to the certificates are used to store important information for the Chain of Trust.

Figure 2:
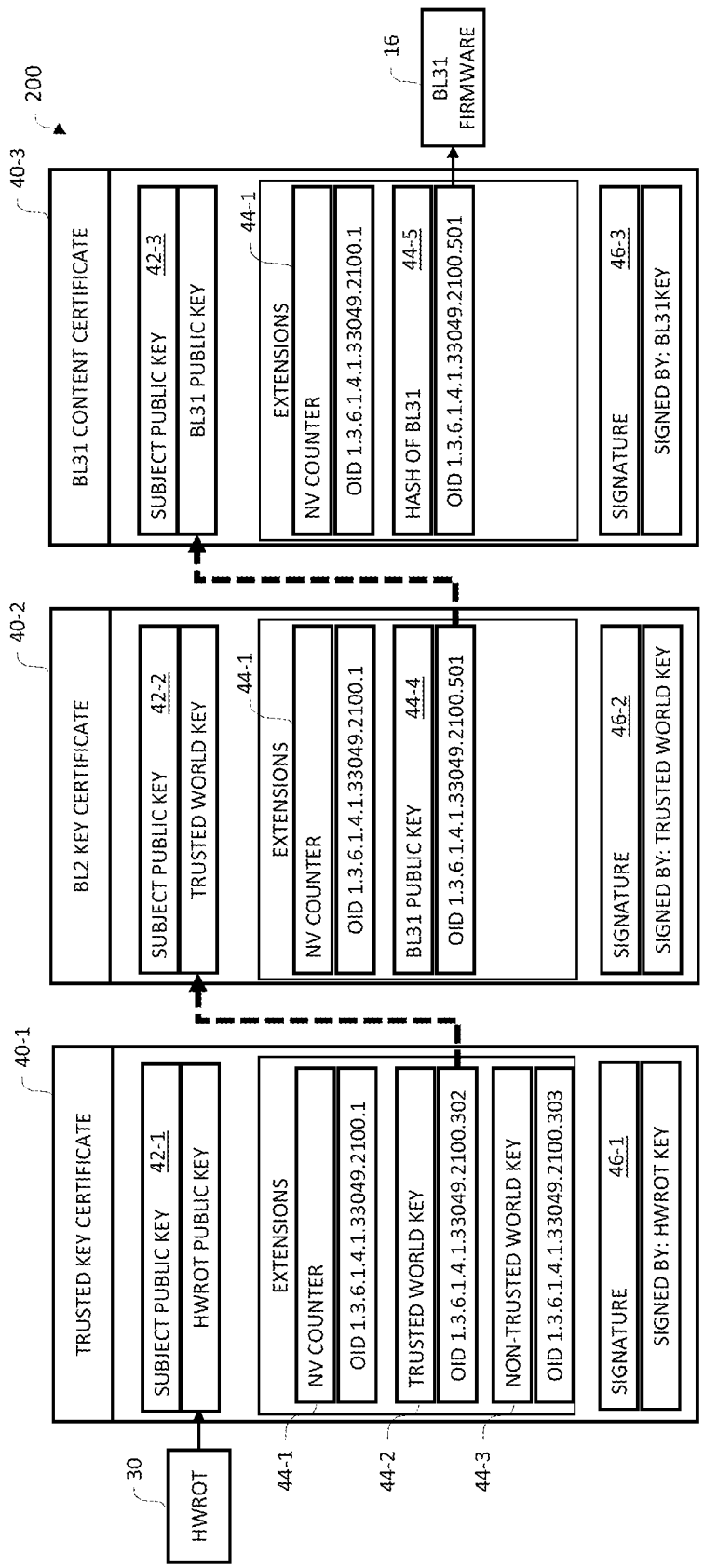
FIG. 2 is a block diagram of a portion of a sample chain of trust that relies on a Root of Trust private key.

FIG. 2 depicts a portion of an example of a Chain of Trust enforcement as specified by the Trusted Board Boot Requirements (TBBR) standard.

Hardware Root of Trust (HWROT) 30 is used as a basis to create multiple certificates 40, wherein each certificate 40 comprises a subject public key 42, a set of extensions 44 and a signature 46. Each certificate 40 may be an x.509 v3 certificate used for Transport Layer Security (TLS)/Secure Socket Layer (SSL) communications.

When trusted key certificate 40-1 is generated, a certificate creation utility (discussed below) consumes HWROT 30 to generate subject public key 42-1. Certificate 40-1 further comprises extensions 44 including Non-Volatile (NV) counter 44-1, Trusted World Key hash 44-2 and non-trusted world key hash 44-3. Signature 46-1 for trusted key certificate 40-1 is signed with Hardware Root of Trust (HWROT) key 30.

When BL2 key certificate 40-2 is created, the certificate creation utility uses trusted world key hash 44-2 from trusted key certificate 40-1 as subject public key 42-2. BL2 key certificate 40-2 further comprises extensions 44 including NV counter 44-1 and BL31 public key hash 44-4. Signature 46-2 for BL2 key certificate 40-2 is signed with Trusted World Key.

When BL31 content certificate 40-3 is created, the certificate creation utility uses BL31 public key 44-4 as subject public key 42-3. BL31 content certificate 40-3 further comprises extensions 44 including NV counter 44-1 and a hash of BL31 44-5. Signature 46-3 for BL31 content certificate is signed with BL31 Key.

As depicted in FIG. 2, the Chain of Trust 200 may continue to BL31 firmware 16.

Figure 3:
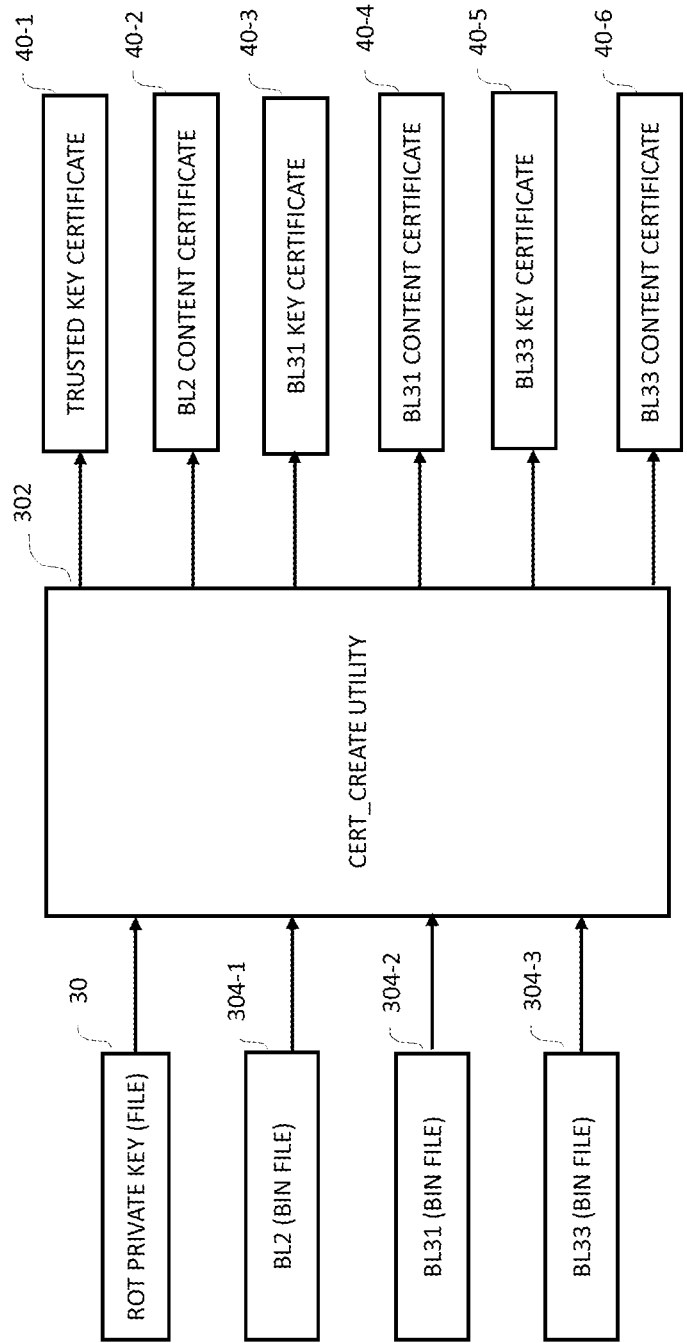
FIG. 3 is a block diagram depicting a certificate creation utility for generating certificates using a private key as an input that can be compromised.

Certificate Creation Utility Compromises Security of Hardware Root of Trust Private Key FIG. 3 depicts a block diagram of a certificate creation utility 302 that receives inputs including a private key file and the binary files 304 (also referred to as bin files) of the firmware volumes 12 as input and generates certificates 40 needed for Chain of Trust 200 depicted in FIG. 2. For example, cert create, is a certificate creation utility 302 provided by ARM and is commonly used to generate certificates 40 using Hardware Root of Trust (ROT) private key 30 as a file.

For example, referring to the boot sequence 100 depicted in FIG. 1, certificate creation utility 302 may receive Hardware Root of Trust (ROT) private key 30 as a file and inputs including BL2 bin file 304-2, BL31 bin file 304-3, and BL33 bin file 304-4 and generate certificates 40 including Trusted Key Certificate 40-1, BL2 Content Certificate 40-2, BL31 Key Certificate 40-3, BL31 Content Certificate 40-4, BL33 Key Certificate 40-5 and BL33 Content Certificate 40-6. Other inputs 304 may be received to generate fewer or more certificates, but a file of Hardware Root of Trust 30 is always used.

Accessibility of the Private Key Presents Security Risks

The consumption of Hardware Root of Trust Private Key 30 by certificate creation utility 302 in a file form poses a significant security risk. If Hardware Root of Trust Private Key 30 is compromised, it could be used to attack the information handling system.

Embodiments provide a more secure approach that still operate within the ARM TBBR by avoiding the use of the root of trust private key 30 as a file.

Figure 4:
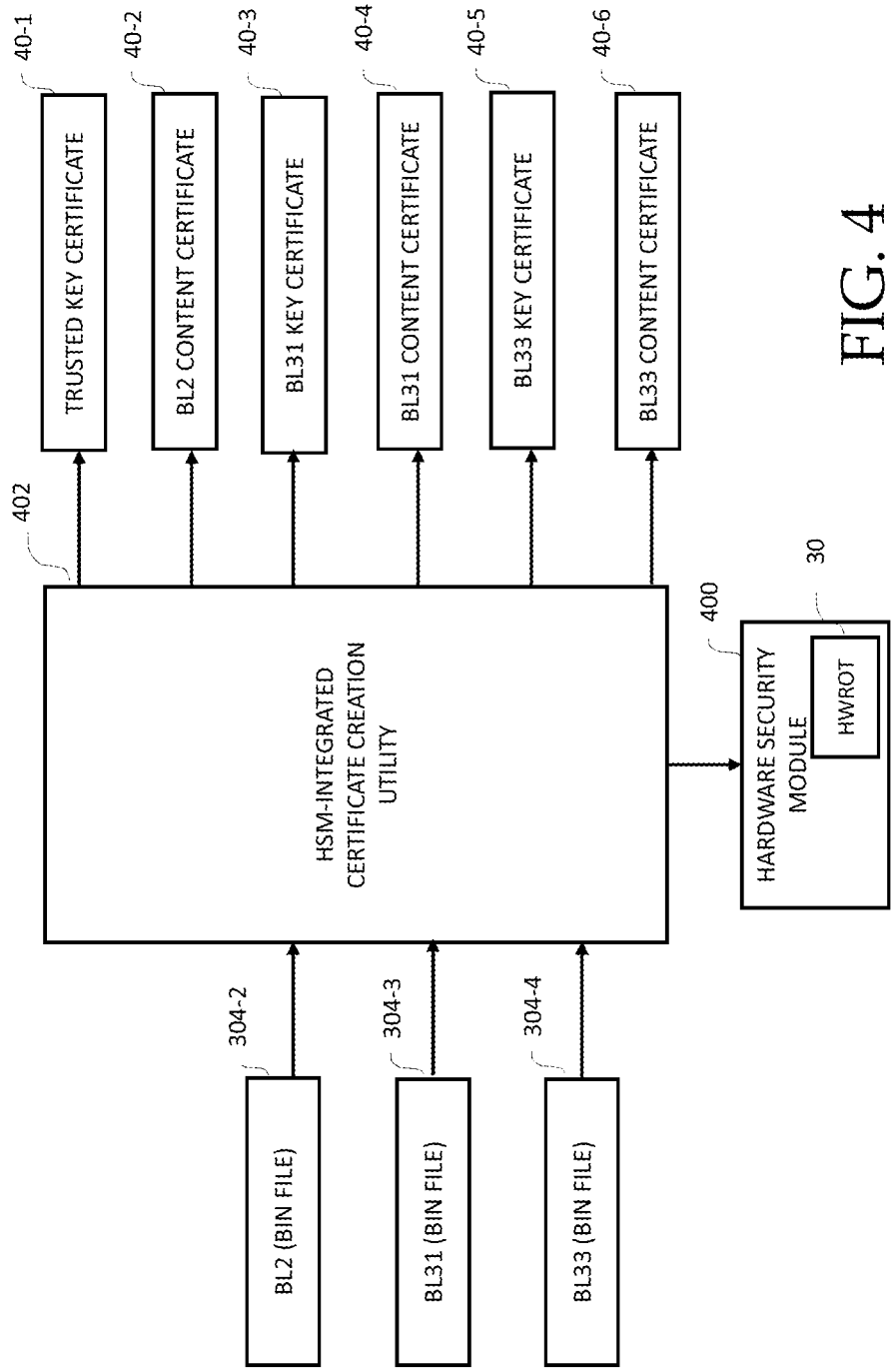
FIG. 4 depicts a block diagram of one embodiment of a HSM-Integrated system for generating certificates to maintain security of a chain of trust while protecting the Root of Trust key.

FIG. 4 depicts a block diagram of a Hardware Security Module (HSM)-Integrated certificate creation utility 402 that receives inputs such as BL2 bin file 304-2, BL31 bin file 304-3, and BL33 bin file 304-4, but does not receive Hardware Root of Trust Private Key 30 as a file. Instead, Hardware Security Module (HSM) 400 stores Hardware Root of Trust Private Key 30 and HSM-Integrated certificate creation utility 402 communicates with HSM 400 to generate certificates 40 such as Trusted Key Certificate 40-1, BL2 Content Certificate 40-2, BL31 Key Certificate 40-3, BL31 Content Certificate 40-4, BL33 Key Certificate 40-5 and BL33 Content Certificate 40-6.

Figure 5:
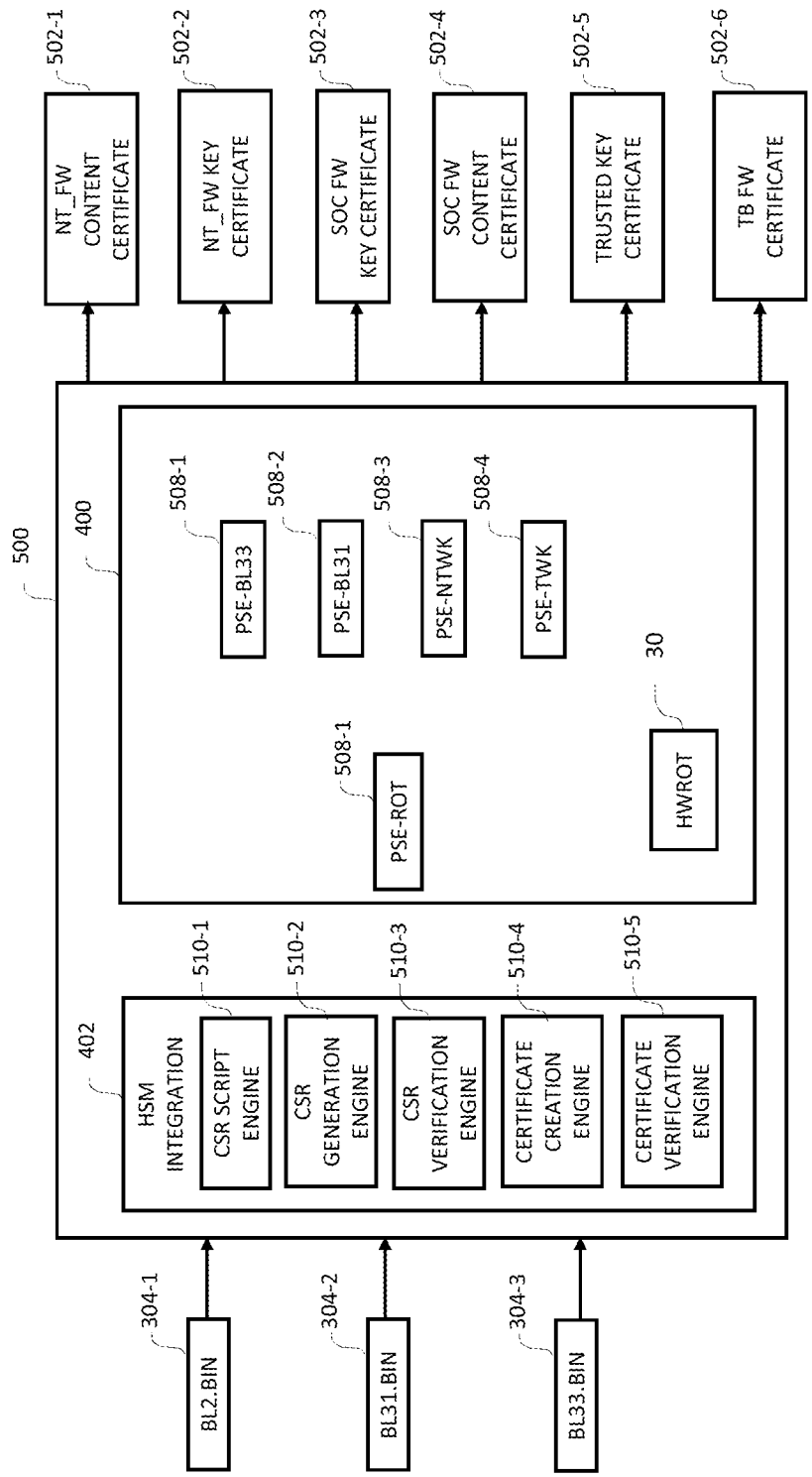
FIG. 5 depicts a block diagram of one embodiment of a HSM-Integrated system for generating certificates to maintain security of a chain of trust.

System for Generating Certificates Using an HSM-Integrated Certificate Creation Utility FIG. 5 depicts a block diagram of a certificate generation system 500 for generating certificates 40 for securing a boot sequence for an information handling system.

Certificate generation system 500 may receive inputs including BL2 bin file 304-1, BL31 bin file 304-2, and BL33 bin file 304-3 and generate a set of certificates 502 including Non-Trusted Firmware Content Certificate 502-1, Non-Trusted Firmware Key Certificate 502-2, SOC Firmware Key Certificate 502-3, SOC Firmware Content Certificate 502-4, Trusted Key Certificate 502-5 and Trusted Boot Firmware Certificate 502-6.

Certificate generation system 500 may include HSM 400 storing Hardware Root of Trust private key 30 and other keys 508 for generating certificate 40. Certificate generation system 500 further includes HSM integration memory 402 storing engines 510 as well as algorithms such as encryption and decryption algorithms and instructions. For example, HSM integration memory 402 may store algorithms and instructions for generating OpenSSL commands described herein.

Certificate generation system 500 may receive BL2 bin file 304-1 containing information associated with BL2 firmware volume 12-2. CSR script engine 510-1 in HSM integration memory 402 may use the information to generate a certificate signing request (CSR) for BL2 firmware volume 12-2. CSR generation engine 510-2 in HSM integration memory 402 such as an OpenSSL gem engine may generate the CSR. CSR verification engine 510-3 may verify the CSR is valid. Certificate generation engine 510-4 may generate a certificate 502 based on the CSR and sign the certificate 502. Signing the certificate 502 may include verifying the certificate 502 is valid. Certificate verification engine 510-5 may verify the certificate. HSM 400 may store Hardware Root of Trust key 30 and other keys 508 including BL33 key 508-1, BL31 key 508-2, Non-trusted World Key 508-3 and Trusted World Key 508-4. Other keys 508 (not shown) may be stored in HSM 400 as well.

Figure 6:
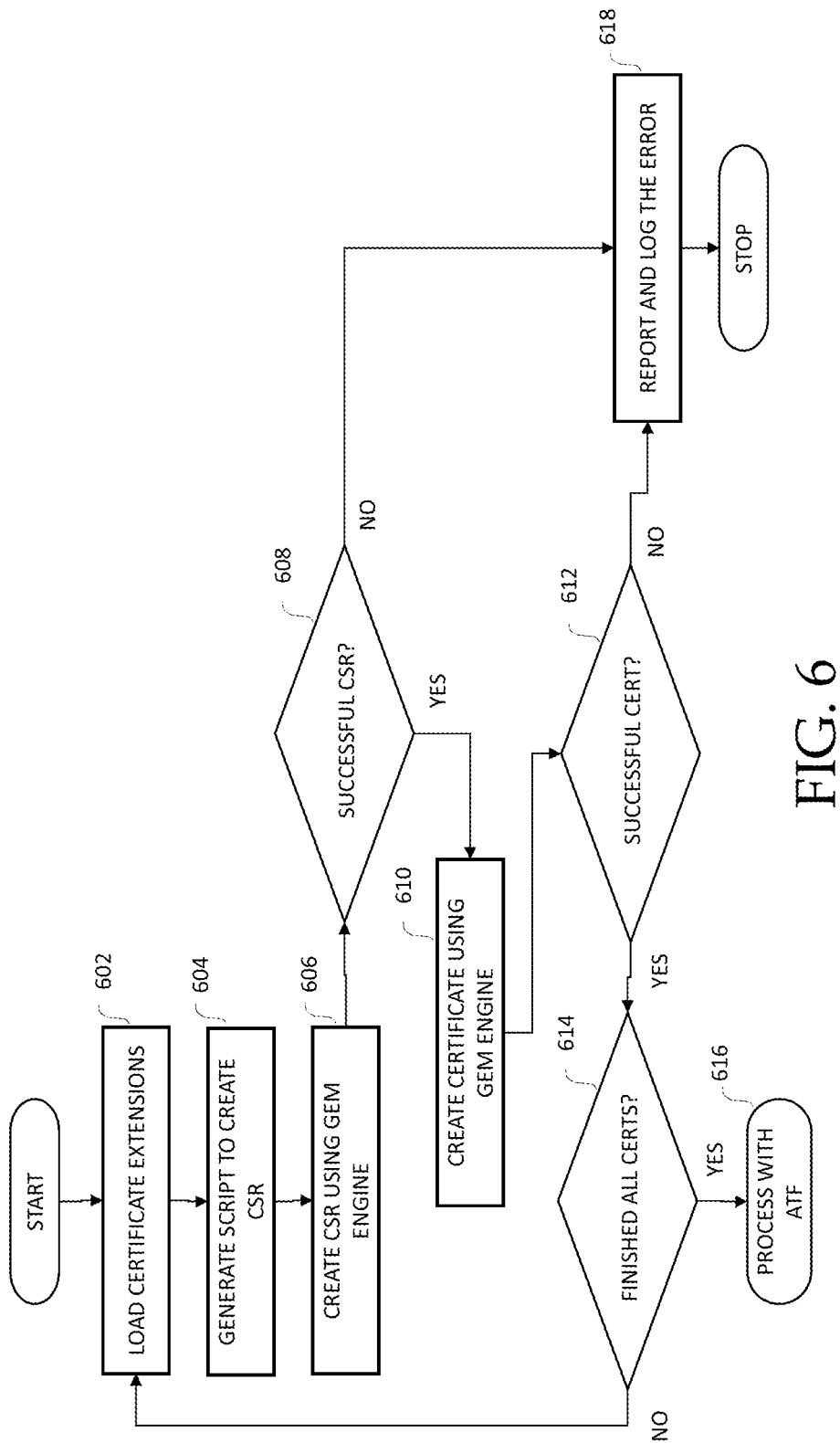
FIG. 6 is a flowgraph depicting a method for generating certificates using a HSM-Integrated system for maintaining a chain of trust.

FIG. 6 depicts a flow diagram 600 of secure method to generating certificates 40 for securing a boot sequence for an information handling system that avoids the use of Hardware Root of Trust Private Key 30*by* (HSM)-Integrated certificate creation utility 402.

The method may begin once a boot sequence is determined. At step 602, embodiments may identify a firmware volume 12 and load information that will be included in a file extension 44 for the firmware volume 12.

At step 604, embodiments generate a script that will be used for generating a Certificate Signing Request (CSR) for the firmware volume. In some embodiments, a template may be used to compose a script. In some embodiments, a script may be an OpenSSL script, wherein (HSM)-Integrated certificate creation utility 402 may populate the script with information received from a bin file 304.

At step 606, embodiments create a CSR using an engine connected to HSM 400. In some embodiments, an engine may be an OpenSSL gem engine. In some embodiments, (HSM)-Integrated certificate creation utility 402 may include instructions to run a command to create a CSR. For example, an OpenSSL command may be: openssl req -new -newkey rsa:2048 -nodes -out request.car -keyout private.key. Parameters such as "-x509", "-sha256" and "days" are not included. At step 608, embodiments determine if the CSR was successful. In some embodiments, (HSM)-Integrated certificate creation utility 402 may include instructions to run a command to verify a CSR is correct. For example, an OpenSSL command may be: openssl req -in request.csr -text -noout -verify.

If the CSR was successful, embodiments create a certificate at step 610. An example command to generate a certificate may be: openssl req -x509 -sha256 -nodes -days 365 -newkey rsa:4096 -keyout private.key -out certificates.cert, wherein "req" is a command for creating a certificate creation request, "-x509" allows OpenSSL to sign the certificate 40, "-sha256" is the hash algorithm used to encrypt the certificate 40, "-nodes" is a command for no DES such that the private key is not password protected, "-days" is the number of days certificate 40 is valid, "-newkey" is the format (e.g. an RSA key with 4096 bit encryption), "-keyout" is the location to store the private key and "-out" is the location to output certificate 40.

At step 612, embodiments determine if the certificate was successful. An example command to verify certificate 40 is correct may be: openssl x509 -in certificate.crt -text -noout, wherein "x509" is combined with other parameters to retrieve information about certificate 40, "-in" is used to identify which certificate 40 is being verified, "-text" strips text headers from the output and "-noout" specifies to not output the encoded version of certificate 40.

If the certificate was generated successfully, then at step 614, embodiments determine if all certificates 40 have been generated. If there are more certificates to be generated, embodiments repeat steps 602-614 until all certificates are created and verified.

If all certificates 40 have been generated, then at step 616, the certificates may be processed as part of an ARM trusted firmware implementation.

If a CSR was not successful or the certificate was not generated successfully, embodiments report and log the error at step 618 and method 600 stops.

Embodiments may be used for secure booting of an information handling system. The information handling system comprises a processor subsystem comprising a system, device, or apparatus operable to interpret and execute program instructions and process data, and may include a microprocessor, microcontroller, digital signal processor (DSP), application specific integrated circuit (ASIC), or another digital or analog circuitry configured to interpret and execute program instructions and process data. In some embodiments, a processor subsystem may interpret and execute program instructions and process data stored on firmware volumes 12 or stored locally (e.g., in a memory subsystem). In the same or alternative embodiments, processor subsystem may interpret and execute program instructions and process data stored remotely (e.g., in a network storage resource).

An information handling system comprises a memory subsystem comprising a system, device, or apparatus operable to retain and retrieve program instructions and data for a period of time (e.g., computer-readable media). A memory subsystem may comprise random access memory (RAM), electrically erasable programmable read-only memory (EEPROM), a PCMCIA card, flash memory, magnetic storage, opto-magnetic storage, and/or a suitable selection and/or array of volatile or non-volatile memory that retains data after power to its associated information handling system is powered down.

An information handling system may have an I/O subsystem comprising a system, device, or apparatus generally operable to receive and transmit data to or from or within an information handling system. An I/O subsystem may represent, for example, a variety of communication interfaces, graphics interfaces, video interfaces, user input interfaces, and peripheral interfaces. In various embodiments, an I/O subsystem may be used to support various peripheral devices, such as a touch panel, a display adapter, a keyboard, a touch pad, or a camera, among other examples. In some implementations, an I/O subsystem may support so-called 'plug and play' connectivity to external devices, in which the external devices may be added or removed while information handling system 100 is operating.

An information handling system may have a local storage resource comprising computer-readable media (e.g., hard disk drive, floppy disk drive, CD-ROM, and other type of rotating storage media, flash memory, EEPROM, or another type of solid-state storage media) and may be generally operable to store instructions and data.

An information handling system may have a network interface comprising a system, apparatus, or device operable to serve as an interface between an information handling system and a network (not shown). A network interface 22 may enable information handling system to communicate over a network using a suitable transmission protocol or standard. In some embodiments, a network interface may be communicatively coupled via a network to a network storage resource (not shown). A network coupled to a network interface may be implemented as, or may be a part of, a storage area network (SAN), personal area network (PAN), local area network (LAN), a metropolitan area network (MAN), a wide area network (WAN), a wireless local area network (WLAN), a virtual private network (VPN), an intranet, the Internet or another appropriate architecture or system that facilitates the communication of signals, data and messages (generally referred to as data). A network interface may transmit data using a desired storage or communication protocol, including, but not limited to, Fibre Channel, Frame Relay, Asynchronous Transfer Mode (ATM), Internet protocol (IP), other packet-based protocol, small computer system interface (SCSI), Internet SCSI (iSCSI), Serial Attached SCSI (SAS) or another transport that operates with the SCSI protocol, advanced technology attachment (ATA), serial ATA (SATA), advanced technology attachment packet interface (ATAPI), serial storage architecture (SSA), integrated drive electronics (IDE), or any combination thereof. A network interface or various components associated therewith may be implemented using hardware, software, or any combination thereof.

Embodiments Maintain Arm Standards

Embodiments disclosed herein may provide a more secure boot process for an information handling system while maintaining the ARM standards. Certificates necessary to boot an information handling system in an ATF implementation can be generated without handling the Root of Trust private key in file form.

The above disclosed subject matter is to be considered illustrative, and not restrictive, and the appended claims are intended to cover all such modifications, enhancements, and other embodiments which fall within the true spirit and scope of the disclosure. Thus, to the maximum extent allowed by law, the scope of the disclosure is to be determined by the broadest permissible interpretation of the following claims and their equivalents, and shall not be restricted or limited by the foregoing detailed description.

What is claimed is:

1. A method for generating a set of certificates for secure booting of an information handling system, the method comprising:
   storing, in a Hardware Security Module, a Hardware Root of Trust private key;
   for each firmware volume:
      loading information associated with a certificate for the firmware volume into a hardware security module (HSM)-Integrated certificate creation utility;
      generating, by a script generating engine executing in the (HSM)-Integrated certificate creation utility, a script for generating a Certificate Signing Request (CSR);
      generating, by a CSR engine executing in the (HSM)-Integrated certificate creation utility, the CSR; and
      generating, by a certificate creation engine executing in the (HSM)-Integrated certificate creation utility, a certificate based on the CSR.

2. The method of claim 1, wherein the script comprises an OpenSSL script and one or more of the script generating engine, the CSR generating engine and the certificate creation engine comprises an OpenSSL gem engine.

3. The method of claim 1, further comprising verifying, by a CSR verification engine executing in the (HSM)-Integrated certificate creation utility, the CSR was generated successfully before generating the certificate.

4. The method of claim 1, further comprising verifying, by a certificate verification engine executing in the (HSM)-Integrated certificate creation utility, the certificate was generated successfully before implementing the certificate in a boot sequence.

5. The method of claim 4, wherein the boot sequence comprises an ARM trusted firmware boot sequence.

6. A system for secure booting of an information handling system, the system comprising:
   a hardware security module (HSM) storing a Root of Trust private key; and
   a Hardware Security Module-Integrated certificate creation utility comprising instructions executable to:
      determine, from a plurality of firmware volumes, a set of firmware volumes associated with a boot sequence;
      for each firmware volume in the set of firmware volumes:
         load information associated with a certificate for the firmware volume;
         generate a script for a Certificate Signing Request (CSR);
         generate the CSR;
         generate a certificate based on the CSR; and
         store the certificate.

7. The system of claim 6, wherein the script comprises an OpenSSL script and one or more of the script generating engine, the CSR generating engine and the certificate creation engine comprises an OpenSSL gem engine.

8. The system of claim 6, wherein the Hardware Security Module-Integrated certificate creation utility comprises a CSR verification engine configured to verify the CSR was generated successfully before generating the certificate.

9. The system of claim 6, wherein the Hardware Security Module-Integrated certificate creation utility comprises a certificate verification engine configured to verify the certificate was generated successfully before implementing the certificate in a boot sequence.

10. The system of claim 9, wherein the boot sequence comprises an ARM trusted firmware boot sequence.

11. An information handling system, comprising:
    a processor subsystem;
    a memory subsystem comprising a plurality of firmware volumes; and
    a system for secure booting of the information handling system, the system comprising:
       a hardware security module (HSM) storing a Root of Trust private key; and
       a Hardware Security Module-Integrated certificate creation utility comprising instructions executable to:
          determine, from the plurality of firmware volumes, a set of firmware volumes associated with a boot sequence;
          for each firmware volume in the set of firmware volumes:
             load information associated with a certificate for the firmware volume;
             generate a script for a Certificate Signing Request (CSR);
             generate the CSR;
             generate a certificate based on the CSR; and
             store the certificate.

12. The information handling system of claim 11, wherein the script comprises an OpenSSL script and one or more of a script generating engine, a CSR generating engine and a certificate creation engine comprises an OpenSSL gem engine.

13. The information handling system of claim 12, wherein a CSR verification engine is configured to verify the CSR was generated successfully before the certificate is generated.

14. The information handling system of claim 11, wherein a certificate verification engine is configured to verify the certificate was generated successfully before implementing the certificate in a boot sequence.

15. The information handling system of claim 14, wherein the boot sequence comprises an ARM trusted firmware boot sequence.

* * * * *